United States Patent Office
3,067,235  
Patented Dec. 4, 1962

3,067,235  
OXIDATION OF ALKYL BORON COMPOUNDS  
Stanley B. Mirviss, Westfield, N.J., assignor to Esso Research and Engineering Company, a corporation of Delaware  
No Drawing. Filed Aug. 5, 1960, Ser. No. 47,622  
6 Claims. (Cl. 260—462)

This invention relates to the oxidation of alkylboranes and the production of alcohols. More particularly, this invention relates to an improved method of making alcohols in which alkylboranes are oxidized at low temperatures and subsequently hydrolyzed.

It is known that alcohols can be made by the air oxidation of alkylboranes at room temperature and higher and then hydrolyzing the borate esters, also referred to as boron alcoholates, to free the alcohols. This process has several disadvantages. The alcohols are produced in low yields and have high bromine numbers. Furthermore, the reaction time is undesirably long. It is also known that alkylboranes may be oxidized by hydrogen peroxide. This process has the disadvantage of being expensive due to the high cost of hydrogen peroxide.

It has now been discovered that by carrying out the oxidation at below room temperature high yields of alcohols are obtained. Moreover, the product has a very low bromine number and the reaction proceeds more rapidly. The reaction may be carried out at atmospheric pressure or superatmospheric pressures.

According to the present invention, alcohols are produced by oxidizing alkylboranes at below room temperature to obtain the borate esters and then hydrolyzing these esters to form the alcohols.

The process is applicable to the production of primary, secondary, and tertiary aliphatic and aromatic alcohols from trialkyl and triarylboranes containing 2 to 26 carbon atoms per alkyl group and 6 to 12 carbon atoms per aryl group respectively. The lower $C_2$ to $C_6$ alcohols which are made from trialkylboranes containing 2 to 6 carbons per alkyl group are useful in the pharmaceutical and plastic, paint and varnish fields, as solvents and as intermediates in the preparation of solvents and other useful products. The $C_7$ to $C_{13}$ alcohols are useful in making plasticizer esters, which can be blended with polyvinyl resins to improve their properties, and the $C_{10}$ to $C_{16}$ alcohols can be used in the preparation of detergents such as the alcohol sulfates or the nonionic detergents prepared by treating with ethylene or propylene oxides. In a preferred embodiment of the invention trialkylboranes containing 2 to 20 carbon atoms per alkyl group are used to make the corresponding $C_2$ to $C_{20}$ aliphatic alcohols.

The alkylboranes can be obtained by reacting an olefin with boron hydrides in the presence of an inert solvent. Suitable reaction temperatures are —40° to 200° C. The reaction is usually carried out at room temperature, and atmospheric pressure for 0.1 to 3 hours. Olefins containing 2 to 26 carbon atoms are used. Pure olefins, narrow cuts or wide cuts may be used to produce a single alcohol, a narrow range of alcohols or a broad smear of alcohols, respectively. If the olefin does not contain a terminal double bond the alkylborane compound produced, some times called boron alkyl, may contain boron-carbon links in which the boron is linked to a non-primary carbon atom of the alkyl group. Such alkylboranes may be thermally isomerized to produce alkyls wherein the boron is linked to a primary carbon atom.

The alkylboranes may be oxidized by air, oxygen containing various amounts of an inert carrier gas such as nitrogen or helium or with pure oxygen. For economic reasons the preferred oxidizing agent is air. The purity of the trialkylborane feed used is not critical. In order to obtain improved yields, the oxidation is carried out at between —25° C. and +10° C., preferably between —10° C. and +10° C. and especially at about 0° C. The pressure is not critical and is generally atmospheric, e.g. 0 p.s.i.g. The reaction can be carried out in the presence of inert diluents, such as hydrocarbons or alkyl and aryl halides. Among the inert liquid diluents that can be used in the oxidation step are pentane, heptane, dodecane, cyclohexane, benzene, carbon tetrachloride, chloroform, chlorobenzene, tetralin, white oil, petroleum naphtha, and mixed xylenes. The preferred diluents are $C_5$ to $C_8$ aromatic and paraffinic hydrocarbons. The reaction, however, can also be effected without a diluent.

Aliphatic ethers, especially diethyl ether, are unsuitable for commercial processes because they form explosive peroxides in the reaction mixture and lead to lower alcohol yields. Moreover, diethyl ether is inflammable and would contaminate the alcohol product with close boiling oxidation by-products which could not be removed from lower alcohols by simple distillation.

The rate at which air or oxygen is contacted with the trialkylborane feed is such that the equivalent of .01 to 2 liters of pure oxygen per mole of trialkylborane per minute passes into the reaction zone or .05 to 10 liters of air. The amount of diluent or solvent present in the reaction mixture is 0 to 90 wt. percent.

Any suitable reactor capable of being cooled to about —25° C. can be used. Various coolants such as ammonia, sulfur dioxide, Freon, and cold brine can be used. For economic reasons cold brine is preferred.

The oxidation can be carried out for a period of 0.5 to 18 hours depending on the reactants used, the concentration of oxygen in the oxidizing gas, and the amount of solvent used. The oxidation is preferably effected for 1 to 10 hours at temperatures of —10 to +10° C. At the preferred temperatures of the invention, a faster oxidation rate can be obtained than at higher temperatures.

Each of the three bonds between the boron atom and the alkyl carbon atoms oxidizes at a different rate. The first boron-carbon bond oxidizes quite readily. The second and third bonds are somewhat more difficult to oxidize and thus as the oxidation proceeds it will be found beneficial in some cases to use excess oxygen in order to completely oxidize the trialkylborane. The oxidation reaction can be partially completed in which case at least one carbon to boron linkage is oxidized, or it can be continued until substantially all three carbon to boron linkages have been oxidized. Generally the reaction is continued until an oxygen analyzer shows no further oxygen absorption, which indicates that substantially all of the boron to carbon linkages have been oxidized. The reaction can be carried out in either a batch or continuous manner.

The borate esters formed are hydrolyzed to obtain the desired alcohols. The hydrolyzing agent may be water, dilute acid or an alkaline solution such as a 5 wt. percent caustic soda solution. In a preferred embodiment of the invention the borate ester, dissolved in n-heptane, is stirred or refluxed with aqueous caustic soda for a few hours and separated into two liquid phases. Where the product alcohol is $C_4$ or higher, the upper layer comprises the diluent and the desired alcohol which may then be separated from the diluent by distillation. The distillation residue is then analyzed to obtain the yield of pure alcohol formed. The lower layer comprises an aqueous solution of sodium borate which may be acidified to obtain boric acid. This boric acid may be converted to diborane by processes known in the art used to make additional boron alkyl.

The following data demonstrate how the present process may be carried out and show its advantages over the higher temperature processes.

Several runs were carried out at temperatures between +75° C. to −25° C. to illustrate the unexpected high yield of alcohol obtained at the lower temperatures and to show the improvement in bromine number as well as the time required to complete the oxidation.

A 500 ml. 4-necked round bottom flask was fitted with a water condenser attached to two dry ice traps, with a thermometer, and with a glass tube with a fritted glass disc at the end. The glass tube was connected to a dry air cylinder via a rotameter and air scrubbing towers which contained Ascarite (NaOH plus asbestos) and Drierite (anhydrous $CaSO_4$) to remove any $CO_2$ and moisture in the air. The exit end of the Dry Ice traps was connected to a rotameter which was partly vented to the hood and partly to an A. O. Beckman Model E-2 Oxygen Analyzer. The equipment was predried and flushed with nitrogen. The flask was then charged with 91.0 g. of tri-n-butylborane (0.50 mole) and 91.0 g. of dry n-heptane (50 wt. percent). Air was then passed into the solution through the scrubbing towers, rotameter, and finally the tube with the fritted glass disc. The inlet air flow rate was 1 liter/min. The reactor was maintained at a temperature of 75° C. The air flow rate was continued 574 minutes until the oxygen analyzer showed no further oxygen absorption. The pressure was maintained at atmospheric pressure.

The reaction product was then saponified with 650 g. of 10 wt. percent aqueous NaOH. The total saponification product was then diluted with diethyl ether, two layers separated, an upper layer containing the alcohol, n-heptane and ether and a lower aqueous layer. The aqueous layer was extracted three times with 200 ml. of ether. The ether layers were combined and added to the separated hydrocarbon layer and dried with anhydrous $MgSO_4$. After filtration of the $MgSO_4$, the ether solution was distilled in a 12 inch packed column to remove the ether. The distillation residue containing the n-heptane and by-products was then analyzed for butyl alcohol content and a yield of 60.8 mole percent of pure alcohol based on the trialkylborane feed was found. The yield of pure alcohol is less than the total amount of distillation residue (minus the n-heptane) due to the presence in the residue of the close boiling by-products. The product had a bromine number of 5.5.

Identical runs were made except for the variation in the reaction temperatures. The data obtained has been assembled below in Table I for comparison.

*Table I*

| Run No. | Reaction temp., °C. | Yield of alcohol, mole percent | Time for completion of oxidation, min. | Alcohol bromine No.[a] |
|---|---|---|---|---|
| 1 | 75 | 60.8 | 574 | 5.5 |
| 2 | 25 | 62.5 | 604 | 4.2 |
| 3 | 10 | 77.0 | 333 | 2.3 |
| 4 | 0 | 80.5 | 297 | 1.4 |
| 5 | −25 | 70.6 | 387 | 0.9 |

[a] Measured as ceq. $Br_2$/g. sample. The bromine number is an indication of the amount of olefin present in the alcohol product.

It can readily be seen that the yield of alcohol is unexpectedly higher at temperatures below about 20° C. and is highest at about 0° C. The bromine number of the product is substantially improved in the lower temperature runs. It was unexpected to find that the time of reaction is less at 0° C. than at the higher temperatures, since it has heretofore been found necessary to use high temperatures and superatmospheric pressures to speed up the oxidation reaction and to obtain substantially complete oxidation.

It is not intended to restrict the present invention to the foregoing examples which are given to illustrate some of the embodiments of the invention. The invention is only to be limited to the scope of the appended claims.

What is claimed is:

1. A process for the oxidation of trialkylborane which comprises reacting said trialkylborane with a molecular oxygen-containing gas at a temperature between −25° C. and +10° C. for a time sufficient to oxidize said trialkylborane and form at least some corresponding borate ester.

2. A process for oxidizing trialkylborane which comprises reacting said trialkylborane containing 2 to 26 carbon atoms per alkyl group with a molecular oxygen-containing gas at a temperature between −10° C. and +10° C. in an inert diluent for a time sufficient to oxidize at least a portion of said trialkylborane to the corresponding borate ester.

3. The process of claim 2 wherein the alkyl groups of said trialkylborane contain 2 to 20 carbon atoms.

4. The process of claim 2 wherein the alkyl groups of said trialkylborane contain 2 to 12 carbon atoms.

5. A process for oxidizing trialkylborane which comprises reacting said trialkylborane containing 2 to 26 carbon atoms per alkyl group with a molecular oxygen-containing gas in an amount of .01 to 2 liters of oxygen per mole of said trialkylborane per minute at a temperature of −10° C. to +10° C. for a period of 2 to 10 hours in the presence of 0 to 90 wt. percent inert solvent to form at least some borate ester.

6. The process of claim 5 wherein the alkyl of said trialkylborane contains 2 to 6 carbon atoms and the solvent is a paraffin.

References Cited in the file of this patent

Johnson et al.: J. Am. Chem. Soc., vol. 60, pp. 121–5 (1938).

Brown et al.: J. Am. Chem. Soc., vol. 81, pp. 6423–8 (1959).